US 6,693,962 B1

(12) United States Patent
Murching et al.

(10) Patent No.: US 6,693,962 B1
(45) Date of Patent: Feb. 17, 2004

(54) PROCESS TO EXTRACT REGIONS OF HOMOGENEOUS TEXTURE IN A DIGITAL PICTURE

(75) Inventors: Anil Murching, Beaverton, OR (US); Naveen Thumpudi, Sammamish, WA (US); Ali Tabatabai, Cupertino, CA (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/495,189

(22) Filed: Feb. 1, 2000

Related U.S. Application Data
(60) Provisional application No. 60/118,208, filed on Feb. 1, 1999.

(51) Int. Cl.$^7$ .................................................. H04N 7/18
(52) U.S. Cl. .............................. 375/240.11; 375/240.08
(58) Field of Search ................................. 348/700–703; 382/254, 277; 375/240.08–240.29

(56) References Cited

U.S. PATENT DOCUMENTS

| | | | | |
|---|---|---|---|---|
| 6,061,471 A | * | 5/2000 | Coleman, Jr. | 382/173 |
| 6,278,446 B1 | * | 8/2001 | Liou et al. | 345/700 |
| 6,285,797 B1 | * | 9/2001 | Lubin et al. | 382/254 |
| 6,360,019 B1 | * | 3/2002 | Chaddha | 382/253 |

* cited by examiner

Primary Examiner—Andy Rao
(74) Attorney, Agent, or Firm—Joseph S. Tripoli; Ronald H. Kurdyla; Joel M. Fogelson

(57) ABSTRACT

A method of extracting regions of homogeneous texture in a digital picture divides the digital picture into blocks, and for each block generates a feature vector as a function of the data moments. From the feature vectors a gradient for each block is extracted in one of two ways, either using a weighted Euclidean distance between the feature vectors or a probability mass function-based distance metric. The gradients are submitted to morphological preprocessing to remove small bumps in the gradient field. A watershed algorithm is then applied to the preprocessed gradient field to segment the gradient field into a set of spatially connected regions of homogeneous texture.

5 Claims, 5 Drawing Sheets

PROCESS TO EXTRACT REGIONS OF HOMOGENEOUS TEXTURE IN A DIGITAL PICTURE

CROSS REFERENCE TO RELATED APPLICATIONS

This is a continuation of provisional U.S. Patent Application Serial No. 60/118,208 filed Feb. 1, 1999, now abandoned.

BACKGROUND OF THE INVENTION

The present invention relates to video data processing, and more particularly to a process for extracting regions of homogeneous texture in a digital picture.

Extraction of semantically meaningful visual objects from still images and video has enormous applications in video editing, processing, and compression (as in MPEG-4) as well as in search (as in MPEG-7) applications. Extraction of a semantically meaningful object such as a building, a person, a car etc. may decomposed into the extraction of homogeneous regions of the semantic object and performing a "union" of these portions at a later stage. The homogeneity can be in color, texture, or motion. As an example, extraction of a car could be considered as the extraction of tires, windows and other glass portions, and the body of the car itself.

What is desired is a process that may be used to extract a homogenous portion of the object based upon texture.

BRIEF SUMMARY OF THE INVENTION

Accordingly the present invention provides a process for extracting regions of homogeneous texture in a digital picture based on a color texture gradient field, using either a weighted Euclidean distance between momentbased feature vectors or a pmf-based distance metric. The digital picture is divided into a plurality of blocks, and for each block a feature vector is generated as a function of the moments of the data. A gradient is extracted for each block as a function of the feature vector, the gradient being defined as the maximum distance between feature vectors of the current block and its nearest neighboring blocks, the distance metric being determined either by using the weighted Euclidean distance or the probability mass function-based distance. The resulting gradient field is smoothed by morphological preprocessing, and the preprocessed gradient field is segmented by a watershed algorithm to produce regions of homogeneous texture.

The objects, advantages and other novel features of the present invention are apparent from the following detailed description when read in conjunction with the appended claims and attached drawing.

DETAILED DESCRIPTION OF THE INVENTION

The process described below is block-based, i.e. the digital picture is first divided into many non-overlapping rectangular blocks (in general blocks of other shapes, of different sizes, and use of overlapping blocks may be used), and then spatially adjacent blocks that have similar texture properties are merged together. This results in the classification of the picture into several spatially contiguous groups of blocks, each group being homogenous in texture.

Figure 1:
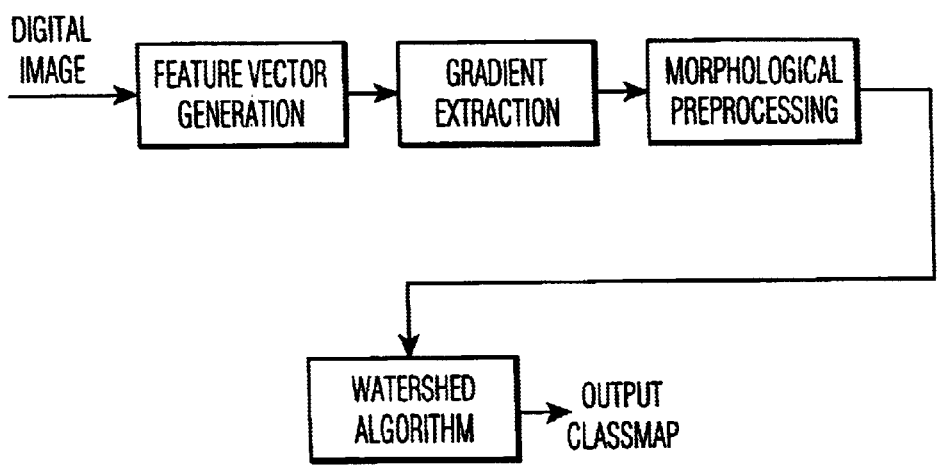
FIG. 1 is a block diagram view of an overall process used in region extraction according to the present invention.

The process segments a digital picture based on a color texture gradient field, and uses one of two methods for computing that gradient field. The first method makes use of a weighted Euclidean distance between moment-based feature vectors. The second method makes use of a so-called pmf-based distance metric. The overall process is shown in FIG. 1.

The digital input images are assumed to be in YUV format. If the inputs are in a chrominance sub-sampled format such as 4:2:0, 4:1:1 or 4:2:2, the chrominance data is upsampled to generate 4:4:4 material.

One feature vector is extracted for each P×Q block of the input picture. There are three stages in the feature vector generation process: color space transformation, sub-band analysis and moment computation.

In the first stage, the data from the original YUV color co-ordinate system is transformed into another co-ordinate system known as CIE—L*a*b* (see *Fundamentals of Digital Image Processing*, by Anil K. Jain, Prentice-Hall, Section 3.9). The latter system is known to be a perceptually uniform color space, i.e. the Euclidean distance between two points (or colors) in the CIE—L*a*b* co-ordinate system corresponds to the perceptual difference between the colors.

Figure 2:
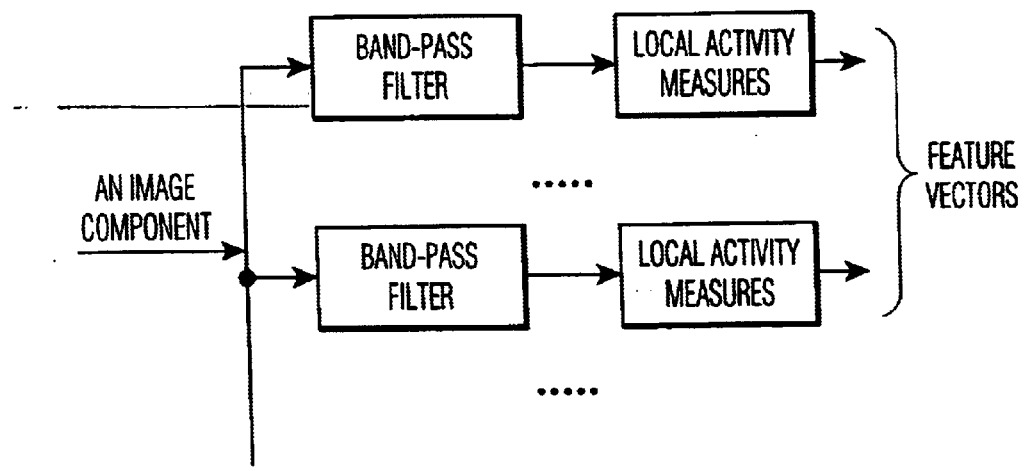
FIG. 2 is a block diagram view of subband analysis and moment computation according to the present invention.
Figure 3:
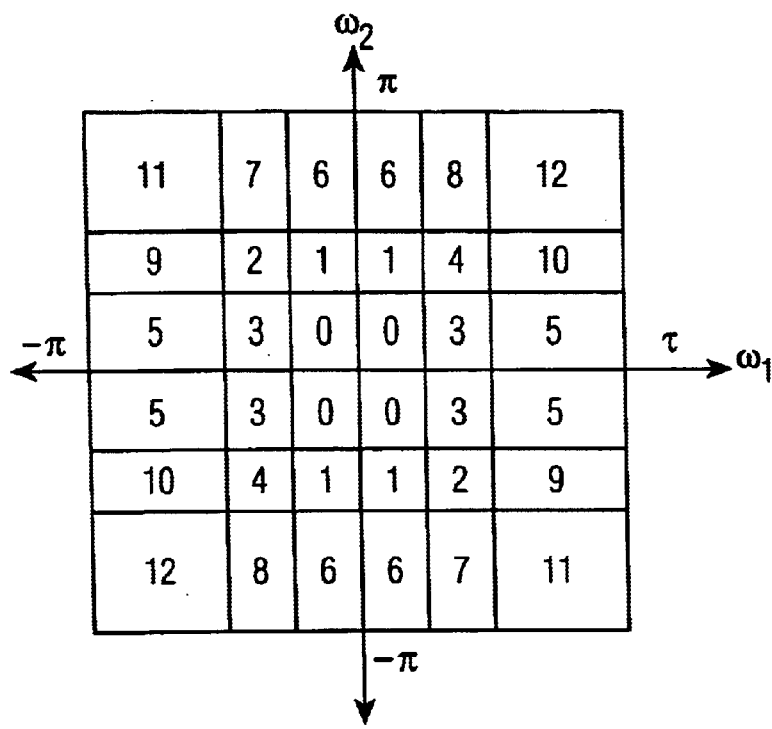
FIG. 3 is an illustrative view of directional decomposition for luminance according to the present invention.
Figure 4:
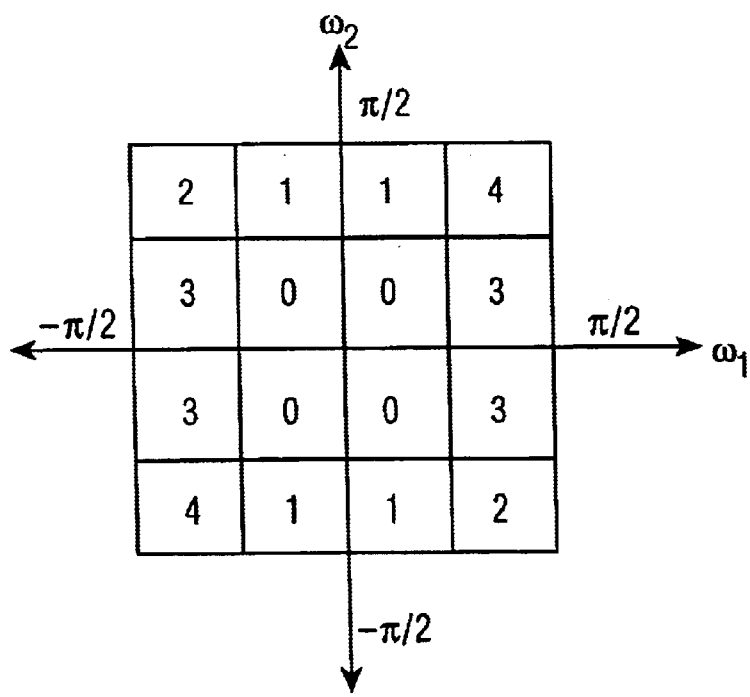
FIG. 4 is an illustrative view of directional decomposition for chrominance according to the present invention.

The next stage is that of sub-band analysis of the three color components. The method used is described in detail in the co-pending provisional U.S. Patent Application Serial No. 60/118,192 entitled "A Process to Extract a Homogeneous Region in a Digital Picture", by T. Naveen, Ali Tabatabai and Anil Murching. Each component of the input image is transformed independently using the structure shown in FIG. 2. The band-pass filter output is called a "sub-band". The luminance component of the input image is "analyzed" into 13 directional sub-bands. The two chrominance components are analyzed into 5 directional sub-bands each. The layout of the frequency response of the band-pass filters is shown in FIG. 3 for luminance (L*), and in FIG. 4 for chrominance planes (a* and b*).

Figure 5:
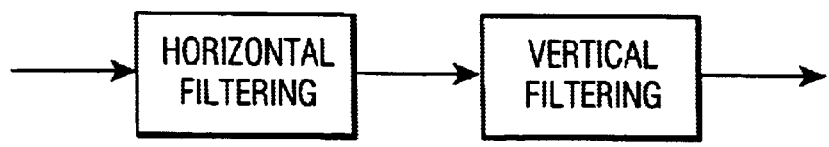
FIG. 5 is a block diagram view of a band-pass filtering operation according to the present invention.

For the extraction of sub-bands that are numbered 0, 1, 3, 5 and 6, use a cascaded (separable) structure, as shown in FIG. 5.

Figure 6:
FIG. 6 is a block diagram view of a directional band-pass filtering operation according to the present invention.
Figure 7:
FIG. 7 is an illustrative view of an original image.
Figure 8:
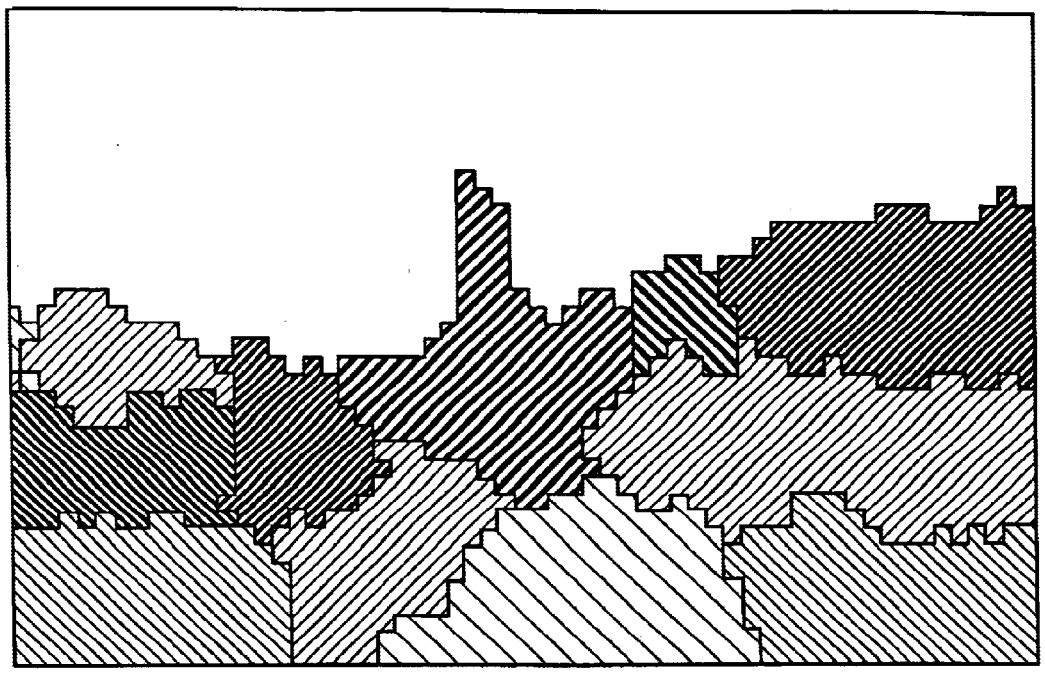
FIG. 8 is an illustrative view of a segmentation map for the image of FIG. 7 according to a first embodiment of the present invention.
Figure 9:
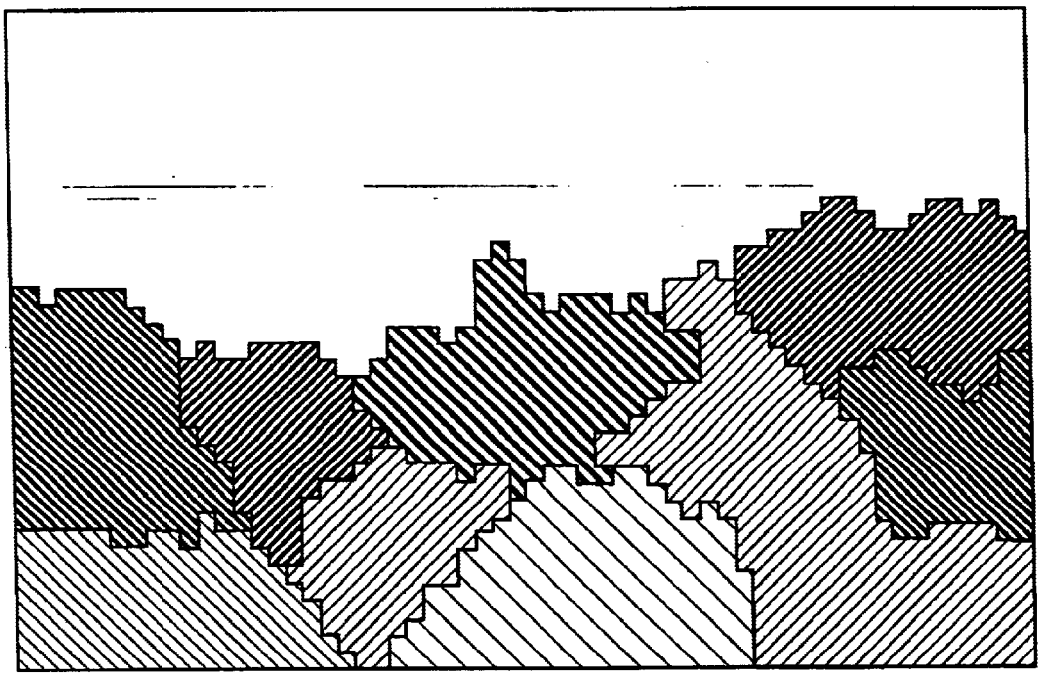
FIG. 9 is an illustrative view of a segmentation map for the image of FIG. 7 according to a second embodiment of the present invention.

For the extraction of directional sub-bands that are numbered 2, 4, 7, 8, 9, 10, 11 and 12, use a cascaded structure, as shown in FIG. 6.

Different stages of filters in the band-pass filtering operation are derived from a set of mother filters, as described below.

$h_0 = [-0.123, 0.25, 0.75, 0.25, -0.125, 0.0]$ $h_1 = [0.0, 0.0, -0.25, 0.5, -0.25, 0.0]$

From the $h_0$ and $h_1$ given above, $g_0$ and $g_1$ are derived through:

$g_0(n) = 2*(-1)^n h_1(n)$ and $g_1(n) = 2*(-1)^n h_0(n)$.

Other filter sets are available in the implementation.

There are two quadrature filters, one favoring southwest and northeast directions, and the other favoring southeast and northwest directions. These 2-D filters also are derived from $h_0$ and $h_1$.

Other filters are derived from $g_0$ and $g_1$.

FilterLL=$g_0$, convolved with interpolated $g_0$. Interpolation is insertion of zeroes at alternative positions of the data being interpolated. The resulting filter is a quarter band 1-D filter, with nominal passband in $|w|\epsilon[0,\pi/4]$ FilterLH=$g_0$, convolved with interpolated $g_1$. The resulting filter is a quarter band 1-D filter, with nominal passband in $|w|\epsilon[\pi/4,\pi/2]$.

FilterH=$g_1$. This filter is a half band 1-D filter, with nominal passband in $|w|\epsilon[\pi/2,\pi]$.

Subsequently, all the filters are normalized, so that the sum of squares of filter coefficients is proportional to their respective bandwidths. By using appropriate filters, the needed sub-bands are obtained.

The next stage in the feature vector generation process is the calculation of the local activity measures in each of the sub-bands. The local activity measures used in this technology are the first N moments computed over non-overlapping rectangular windows of size P×Q. In this implementation, N=3, P=13, and Q=13. Since there are 13 sub-bands for the luminance component and five sub-bands for each chrominance component, there are a total of 23 sub-bands. For each P×Q block in the original color image, there are 26*3=69 moments. This set of moments constitutes the (69×1) feature vector that characterizes the block. Denote the feature vector of the (i, j)-th block of the input picture as shown in the Appendix.

The next stage in the region extraction process is that of gradient extraction. Estimate a block-based gradient field for the input picture (i.e. get one scalar gradient value for each P×Q block of the input picture). The gradient at the (i, j)-th block of the input picture is defined as the maximum of the distances between the block's feature vector f(i,j) and its nearest neighbor's feature vectors. (See Appendix for formulae).

(Note: in the maximization, let k and l each vary from −1 to +1, but do not allow k=l=0 simultaneously! Also, along the borders of the image, consider only those neighboring blocks that lie inside the image boundaries). There are two types of distance functions: a weighted Euclidean distance and a probability mass function based distance. Other methods may be used to select the gradient value from the above set of distances, for example the minimum, median, etc.

In the first embodiment the distance function d[.,.] is defined to be the weighted Euclidean distance between the standard deviations (measured within the P×Q blocks) for the 23 sub-bands. Given the block's feature vector, compute the standard deviations in a straightforward manner.

In the formula in the Appendix, the weighting factors may be used to account for the differences in scale among the various sub-bands and the various color components. This metric is very easy to implement. Set the weighting factors to unity (this makes sense, since the CIE—L*a*b* space is perceptually uniform, and the sub-band analysis filter coefficients have been appropriately scaled).

The second choice of the distance metric is a little more involved. Here, exploit the fact that using the moments of the data within the P×Q block, compute an approximation to the probability mass function (pmf) of that data. The pmf essentially describes the distribution of the data to be composed of a mixture of several values, with respective probabilities. The values and the probabilities together constitute the pmf. Compute these values using the moments as follows.

For ease of notation, we will drop the subscripts L, a, and b and the sub-band indices, because the equations that apply to all 3 color components and to all sub-bands.

Initially, approximate the distribution as a mixture of two values, with respective probabilities. Use a moments-based approach to estimate the values. In this method, only the first three moments of the data (i.e. N=3) are needed. (See Appendix)

Thus, the moment-based feature vector of each P×Q block is converted into a pmf-based representation. With such a representation, the distance between two feature vectors may be computed via the distance between the two pmf's. For this, the Kolmogorov-Smirnoff (K-S) test is used, as described in Section 14.3 of *"Numerical Recipes in C"*, $2^{nd}$ edition, by W. A. Press, S. A. Teukolsky, W. T. Vetterling, and B. P. Flannery, Cambridge University Press. (Essentially, the distance between two pmf's is the area under the absolute value of the difference between the two cumulative distribution functions, see the above-mentioned chapter for details). Though the K-S test is prescribed for pmf's of a single variable, the actual data is in fact 23-dimensional (a total of 23 sub-bands in the L, a, and b components). Strictly speaking, compute the joint, 23-dimensional pmf, and then compute a distance between such pmf's. This is however a very hard problem to solve, and instead, a simplifying assumption is made. Assume that the texture data in a P×Q block may be modeled by means of 23 independent pmf's, one for each of the sub-bands. (See Appendix)

The gradient field, as computed above, yields values that lie along the positive real axis (i.e. may vary from zero to infinity). In practice, the gradient values occupy a finite range from a minimum gradient to a maximum gradient. Digitize the gradient field at a precision of B bits, by dividing the above range into $2^B$ levels. In this implementation, choose B=8.

After the gradient field has been digitized, perform morphological preprocessing. This process removes small bumps in the gradient field, and helps a subsequent watershed algorithm to perform a better segmentation. The preprocessing algorithm used is taken from *"Unsupervised Video Segmentation Based on Watersheds and Temporal Tracking"*, by Demin Wang, pages 539 through 546, IEEE Transactions on Circuits and Systems for Video Technology, Volume 8, Number 5, September 1998. "Reconstruction By Erosion" is used, and its implementation is described in *"Morphological Grayscale Reconstruction in Image Analysis: Applications and Efficient Algorithms"*, by Luc Vincent, pages 176 through 201, IEEE Transactions on Image Processing, Volume 2, Issue 2, April 1993. In this process a smoothing threshold is used that is 0.7% of the dynamic range of the gradient field.

The digitized gradient field, after the above preprocessing, is segmented by what is known as the watershed algorithm. The algorithm description is in the above-mentioned journal article by Luc Vincent. The watershed algorithm divides the gradient field into a set of spatially connected regions, each of which is "smooth" in its interior. Thus, these regions are characterized by having strong gradients at their boundaries. Since the gradient value is proportional to the (perceptual) difference in texture, by calculating the distance metric as above, the image is segmented into regions of homogenous texture.

Once the input digital image has been segmented into regions that are homogenous in texture and are spatially connected, this information may be used in database/search applications. Each region may be represented by one feature vector, consisting of the same set of moments that were used in the segmentation process, or consisting of the pmf-based representation that are computed from those moments. The latter representation is more powerful, because capturing the probability distribution of the data is known to be very useful for indexing visual objects for search applications. In this case, use the work by Szego ("Orthogonal Polynomials", $4^{th}$ edition, American Math. Society, Providence, Volume 23, 1975) to compute the pmf-based representation from the moments. Then, create an entry for this image in the database, consisting of the classification map together with the characteristic feature vector for each class (region). The use of such an index for database applications is described in the above-mentioned co-pending application.

Thus the present invention provides a process to extract regions of homogeneous texture in a digital picture by extracting a feature vector for each block, extracting a gradient, doing morphological pre-processing and performing a watershed algorithm.

What is claimed is:

1. A method of extracting regions of homogeneous texture in a digital picture comprising the steps of:

generating feature vectors for each block of the digital picture;

extracting from the feature vectors a gradient for each block; preprocessing the gradients morphologically; and segmenting the preprocessed gradients with a watershed algorithm to extract the regions of homogeneous texture.

2. The method as recited in claim 1 wherein the generating step comprises the steps of:

for each block transform color information into a perceptually uniform color space having three color components;

bandpass filtering the transformed color information to obtain a plurality of sub-bands; and calculating a local activity measure for each sub-band as N moments computed over the block, the set of moments forming the feature vector for the block.

3. The method as recited in claim 1 wherein the extracting step comprises the step of:

computing a standard deviation for each block as a function of the feature vector; and obtaining a weighted Euclidean distance between the standard deviations, the gradient for each block being the maximum of the weighted Euclidean distances between the feature vector and the feature vectors of the nearest neighboring blocks.

4. The method as recited in claim 2 wherein the extracting step comprises the steps of:

converting the feature vector of each block into a probability mass function representation; and computing the distance between the probability mass function representation between the block and each nearest neighboring block, the gradient being the maximum of the distances between probability mass function representations.

5. A method for extracting data related to homogenous texture of a digital picture comprising the steps of:

dividing the digital picture into blocks of at least one shape;

performing a directional decomposition of the blocks for determining a luminance component related to each of the blocks;

determining a gradient field for each of the blocks using the luminance component related to each of the blocks, wherein the gradient field for each of the blocks is used to calculate a minimum and a maximum value for the homogenous texture corresponding to each of the blocks.

* * * * *